2,728,739
POLYMERS OF N-ACRYLYLPYRROLIDINE

Wilford Donald Jones, Summit, N. J., assignor to Celanese Corporation of America, New York, N. Y., a corporation of Delaware No Drawing. Application August 22, 1952,
Serial No. 305,910

4 Claims. (Cl. 260—32.4)

This invention relates to polymeric materials and relates more particularly to the preparation of polymers of N-acrylylpyrrolidine.

An important object of this invention is to provide polymers of N-acrylylpyrrolidine.

Other objects of this invention will be apparent from the following detailed description and claims.

According to the present invention, it has been found that polymers of N-acrylylpyrrolidine from a valuable class of materials whose properties render them suitable for a large number of commercial applications. The polymers of N-acrylylpyrrolidine may be homopolymers or they may be copolymers with other organic compounds that contain a carbon to carbon double bond and will polymerize with the N-acrylylpyrrolidine. Depending upon their precise composition, the polymers range from water-soluble materials to materials that are soluble in only a limited class of solvents.

Substances that may be copolymerized with the N-acrylylpyrrolidine include for example acrylonitrile, methacrylonitrile, vinyl acetate, alpha-methyl styrene, vinyl chloride, methyl methacrylate, vinylidene chloride, methyl acrylate, methyl-vinyl ketone, beta chloroethyl acrylate and 2,5-dichlorostyrene. The copolymers may contain between about 2 and 98 mole % of the N-acrylylpyrrolidine. Copolymers of N-acrylylpyrrolidine with acrylonitrile, particularly those containing between about 5 and 50 mole % of N-acrylylpyrrolidine, form an especially valuable class of materials that are suited for the production of filamentary materials, films and the like. These copolymers have a softening point only slightly below that of polyacrylonitrile itself, but show an improved solubility in organic solvents so that they may be more conveniently dissolved to form solutions suitable for the production of filamentary materials, films and the like. In addition, these copolymers show an improved affinity toward commercially available dyestuffs than polyacrylonitrile so that objects containing said copolymers may be more easily dyed than polyacrylonitrile.

The polymerization may be carried out in an aqueous medium in the presence of a polymerization catalyst and an accelerator. There may also be present in the aqueous medium, a redox system, iron salts and the like, all as well known in the art of polymerizing monomers containing a carbon to carbon double bond.

The polymers of this invention, when water soluble, may be employed as thickening agents, for the production of textile sizes and for other related applications, where it is desired to increase the viscosity of an aqueous solution. In such applications, the polymers may be mixed with other thickening agents, softening agents, plasticizers and the like. The polymers may also be employed for the production of films, in which case they may be compounded with plasticizers, fire retardants, ultra-violet light absorbing materials, dyes, pigments, nacreous materials and similar substances for changing the properties or the appearance of the final products. The polymers are also suited for the production of filamentary materials by dry or wet-spinning processes. For the production of filamentary materials, there may be added to the polymers pigments, dyes and the like to change the appearance of the final product.

The following examples are given to illustrate this invention further.

Example I

A solution of 25 parts by weight of N-acrylylpyrrolidine in 250 parts by weight of water is passed through ion exchange columns containing both cation and anion ion exchange resins to remove ionizable impurities therefrom. The ion exchange columns are washed three times with 50 parts by weight of water and the washings are combined with the first solution and the whole is diluted to bring the concentration of N-acrylylpyrrolidine to 50 grams per liter of solution.

Into a container there is charged an amount of solution, prepared as above, containing 4.20 parts by weight of N-acrylylpyrrolidine, 5.0 parts by weight of acrylonitrile and 40 parts by weight of water. The container is sparged with nitrogen and there are introduced into the container 5 parts by weight of a 1% aqueous solution of potassium persulfate and 5 parts by weight of a 1% aqueous solution of sodium metabisulfite. The container is closed and brought to a temperature of 45° C. with stirring.

At the end of 14.3 minutes, stirring is stopped and the polymerization is interrupted by the addition to the polymerization medium of 25 parts by weight of an aqueous solution containing 20 grams of hydroquinone, 20 grams of sodium carbonate and 5 grams of sodium hydroxide per liter. The polymer is isolated by filtration, washed several times with water and dried in a vacuum at 60° C. There is obtained 5.87 parts by weight, or 63.7% of theory, of a polymer containing 63% by weight of acrylonitrile as determined by nitrogen analysis.

The polymer, in powdered form, becomes tacky at a temperature of 156° C. as compared with 190° C. for acrylonitrile. The polymer is soluble in dimethylformamide and in mixtures of dimethylformamide and nitromethane containing up to about 50% by weight of nitromethane. It is swollen by acetonitrile, dimethyl sulfolane, mixtures of acetonitrile with nitromethane and ethylene carbonate, and mixtures of nitromethane and p-cresol. Solutions of the polymer yield filamentary materials, films and the like by wet-spinning and dry-spinning processes.

Example II

N-acrylylpyrrolidine is polymerized alone, employing the procedure set forth in Example I and a charge containing 10 parts by weight of the monomer. There are obtained, after 120 minutes of polymerization, 9.5 parts by weight of the polymer, or 95% of theory. The polymer exhibits a tack temperature of 166° C. It is soluble in water, dimethylformamide, acetronile and nitromethane. It may be used for the production of textile sizes and the like.

It is to be understood that the foregoing detailed description is given merely by way of illustration and that many variations may be made therein without departing from the spirit of my invention.

Having described my invention what I desire to secure by Letters Patent is:

1. A copolymer of N-acrylylpyrrolidine and acrylonitrile containing between about 5 and 50 mole % of the N-acrylylpyrrolidine.

2. A process for the production of polymeric materials which comprises copolymerizing N-acrylylpyrrolidine and acrylonitrile, there being present between about 5 and 50 mole % of the N-acrylylpyrrolidine.

3. A solution of the copolymer of claim 1 in dimethylformamide.

4. A solution of the copolymer of claim 1 in a mixture of dimethylformamide and nitromethane.

References Cited in the file of this patent

UNITED STATES PATENTS 2,643,990   Ham ------------------ June 30, 1953

OTHER REFERENCES

U. S. Publication Board, Report 70429 Frames 8645–8656, April 21, 1941.

U. S. Publication Board, Report 70335 Frames 3391–3402, December 28, 1940.